US010915227B1

(12) United States Patent
Proud et al.

(10) Patent No.: US 10,915,227 B1
(45) Date of Patent: Feb. 9, 2021

(54) SYSTEM FOR ADJUSTMENT OF RESOURCE ALLOCATION BASED ON MULTI-CHANNEL INPUTS

(71) Applicant: Bank of America Corporation, Charlotte, NC (US)

(72) Inventors: Lee Ann Proud, Ponte Vedra, FL (US); Kathleen Hanko Trombley, Oakboro, NC (US); Martha Sain McClellan, Lancaster, SC (US); Joseph Benjamin Castinado, North Glenn, CO (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 16/534,852

(22) Filed: Aug. 7, 2019

(51) Int. Cl.
  *G06F 3/16* (2006.01)
  *G06F 3/0482* (2013.01)
  *G06F 9/451* (2018.01)
  *G06F 40/205* (2020.01)
  *G10L 15/26* (2006.01)

(52) U.S. Cl.
  CPC ............ *G06F 3/0482* (2013.01); *G06F 3/167* (2013.01); *G06F 9/451* (2018.02); *G06F 40/205* (2020.01); *G10L 15/26* (2013.01)

(58) Field of Classification Search
  CPC combination set(s) only.
  See application file for complete search history.

(56) References Cited

U.S. PATENT DOCUMENTS

| | | | |
|---|---|---|---|
| 3,828,132 | A | 8/1974 | Flanagan et al. |
| 4,688,195 | A | 8/1987 | Thompson et al. |
| 6,182,142 | B1 | 1/2001 | Win et al. |
| 7,124,081 | B1 | 10/2006 | Bellegarda |
| 7,124,082 | B2 | 10/2006 | Freedman |
| 7,137,126 | B1 | 11/2006 | Coffman et al. |
| 8,112,037 | B2 | 2/2012 | Ketari |
| 8,335,723 | B2 | 12/2012 | Tedesco et al. |
| 9,697,822 | B1 | 7/2017 | Naik et al. |
| 9,818,402 | B2 | 11/2017 | Emerick et al. |
| 10,135,965 | B2 | 11/2018 | Woolsey et al. |
| 10,199,051 | B2 | 2/2019 | Binder et al. |
| 2002/0002504 | A1 | 1/2002 | Engel et al. |
| 2002/0107807 | A1 | 8/2002 | Ketonen et al. |
| 2003/0216969 | A1* | 11/2003 | Bauer ............... H01Q 7/00 705/22 |
| 2006/0229870 | A1 | 10/2006 | Kobal |
| 2006/0247931 | A1 | 11/2006 | Caskey et al. |

(Continued)

*Primary Examiner* — Hein L Duong
(74) *Attorney, Agent, or Firm* — Michael A. Springs; Moore & Van Allen PLLC; Nicholas C. Russell

(57) ABSTRACT

Embodiments of the invention are directed to systems, methods, and computer program products for providing a system for adjustment of resource allocation based on multi-channel inputs that is configured for intelligent, proactive and responsive communication with a user, via a user device. The system is further configured to perform one or more user activities, in an integrated manner, within a single interface of the user device, without requiring the user to operate disparate applications. Furthermore, the system is configured to receive user input through multiple communication channels such as a textual communication channel and an audio communication channel. The system is further configured to switch between the various communication channels seamlessly, and in real-time.

20 Claims, 4 Drawing Sheets

(56) References Cited

U.S. PATENT DOCUMENTS

| | | |
|---|---|---|
| 2006/0253787 A1 | 11/2006 | Fogg |
| 2006/0265208 A1 | 11/2006 | Assadollahi |
| 2007/0034107 A1 | 2/2007 | Barbeau et al. |
| 2012/0016678 A1* | 1/2012 | Gruber ................... G06F 9/54 704/275 |
| 2013/0275138 A1 | 10/2013 | Gruber et al. |
| 2013/0275164 A1* | 10/2013 | Gruber ................. G10L 17/22 705/5 |
| 2013/0275875 A1 | 10/2013 | Gruber et al. |
| 2014/0067596 A1* | 3/2014 | McGovern ......... G06Q 30/0246 705/26.7 |
| 2014/0081633 A1* | 3/2014 | Badaskar .............. G10L 15/26 704/235 |
| 2014/0280292 A1* | 9/2014 | Skinder ............ G06F 16/24534 707/767 |
| 2014/0350943 A1 | 11/2014 | Goldstein |
| 2014/0358629 A1* | 12/2014 | Shivaswamy ........ G06Q 10/087 705/7.29 |
| 2015/0046281 A1* | 2/2015 | Shivaswamy ...... G06Q 30/0631 705/26.7 |
| 2015/0256542 A1* | 9/2015 | Alasingara Bhattachar ................ H04L 9/3228 713/182 |
| 2015/0310466 A1* | 10/2015 | LaCivita ............ G06Q 30/0205 705/7.34 |
| 2017/0329573 A1* | 11/2017 | Mixter ................... H04N 21/20 |
| 2017/0358302 A1* | 12/2017 | Orr ....................... G06F 16/433 |
| 2017/0372700 A1* | 12/2017 | Volkov ................. G06F 16/686 |
| 2018/0061401 A1* | 3/2018 | Sarikaya ................ G10L 15/22 |
| 2018/0114127 A1* | 4/2018 | Cole ....................... H04L 67/18 |
| 2018/0247065 A1* | 8/2018 | Rhee ....................... G07C 9/257 |
| 2020/0099633 A1* | 3/2020 | D'Agostino .......... G06F 3/0482 |

* cited by examiner

SYSTEM FOR ADJUSTMENT OF RESOURCE ALLOCATION BASED ON MULTI-CHANNEL INPUTS

BACKGROUND

Existing systems require a user to navigate multiple applications and perform numerous actions to perform electronic activities on an electronic device. Furthermore, execution of the electronic activities requires the user to be adept with various distinct functions and technology elements of a myriad applications in order to retrieve certain information. As such, a need exists for an intelligent, proactive and responsive system that facilitates execution of electronic activities in an integrated manner.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later. Embodiments of the present invention address these and/or other needs by providing a system for adjustment of resource allocation based on multi-channel inputs that is configured for intelligent, proactive and responsive communication with a user, via a user device. The system is further configured to perform one or more user activities, in an integrated manner, within a single interface of the user device, without requiring the user to operate disparate applications. Furthermore, the system is configured to receive user input through multiple communication channels such as a textual communication channel and an audio communication channel. The system is further configured to switch between the various communication channels seamlessly, and in real-time. In some instances, the system comprises: at least one memory device with computer-readable program code stored thereon, at least one communication device, at least one processing device operatively coupled to the at least one memory device and the at least one communication device, wherein executing the computer-readable program code is typically configured to cause the at least one processing device to perform, execute or implement one or more features or steps of the invention.

Embodiments of the invention relate to systems, computer implemented methods, and computer program products for establishing intelligent, proactive and responsive communication with a user, comprising a multi-channel cognitive resource platform for performing electronic activities in an integrated manner from a single interface, the invention comprising: providing a multi-channel cognitive resource application on a user device associated with the user, wherein the multi-channel cognitive resource application is configured to present a central user interface on a display device of the user device; displaying, via the central user interface, a first user activity request option; conducting, via the central user interface, a first conversation with the user, wherein conducting the first conversation comprises: receiving, via the central user interface, a user activity input from the user regarding initiation of a user activity request, wherein the activity input is received through a first communication medium; and presenting, via the central user interface, the received activity input from the user; analyzing the content of the user activity request received from the user to determine a set of response options; displaying, via the central user interface, the set of selectable response options; receiving, via the central user interface, an indication that the user has selected a specific response option from the set of selectable response options; and initiating completion of the specific response option within the central user interface of the multi-channel cognitive resource application.

In some embodiments, or in combination with any of the previous embodiments, the receiving an indication that the user has selected a specific response option further comprises using a second communication medium to communicate with the user that is different from the first communication medium.

In some embodiments, or in combination with any of the previous embodiments, the first communication medium comprises an audio channel and the second communication medium comprises an textual communication channel, wherein switching the communication channel of the first conversation comprises switching, automatically, from the audio channel to the textual communication channel.

In some embodiments, or in combination with any of the previous embodiments, the first communication medium comprises recorded audio of the user's voice received via the central user interface on the user device.

In some embodiments, or in combination with any of the previous embodiments, analyzing the content of the user activity request received from the user further comprises: parsing the first user activity input to determine one or more activity keywords associated with the user activity request; and generating a tree of response options related to the activity keywords associated with the user activity request.

In some embodiments, or in combination with any of the previous embodiments, the invention further comprises authenticating the user prior to initiating completion of the specific response option, wherein authenticating the user includes accessing a security parameter of another application on the user device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
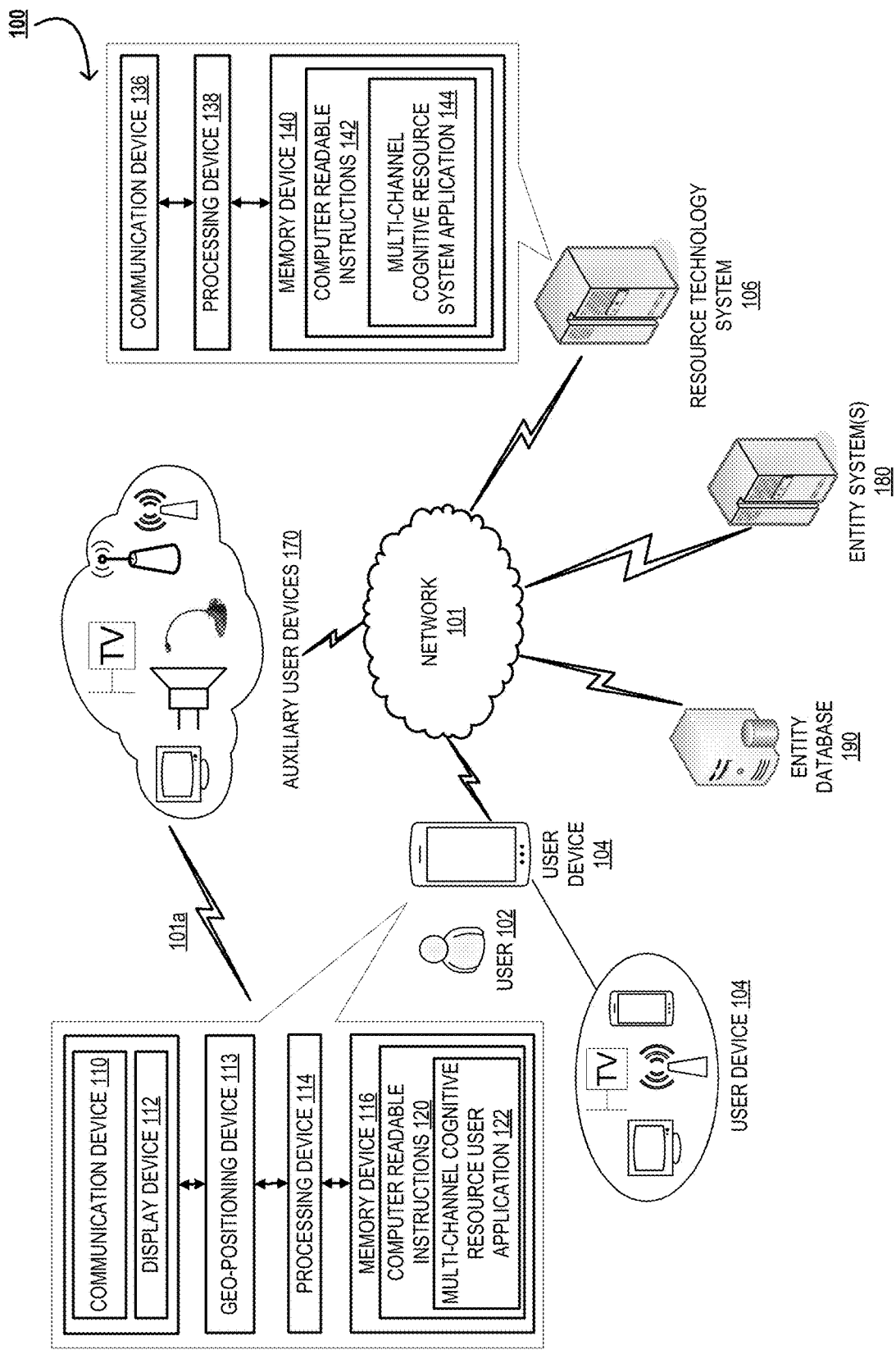
Figure 2:
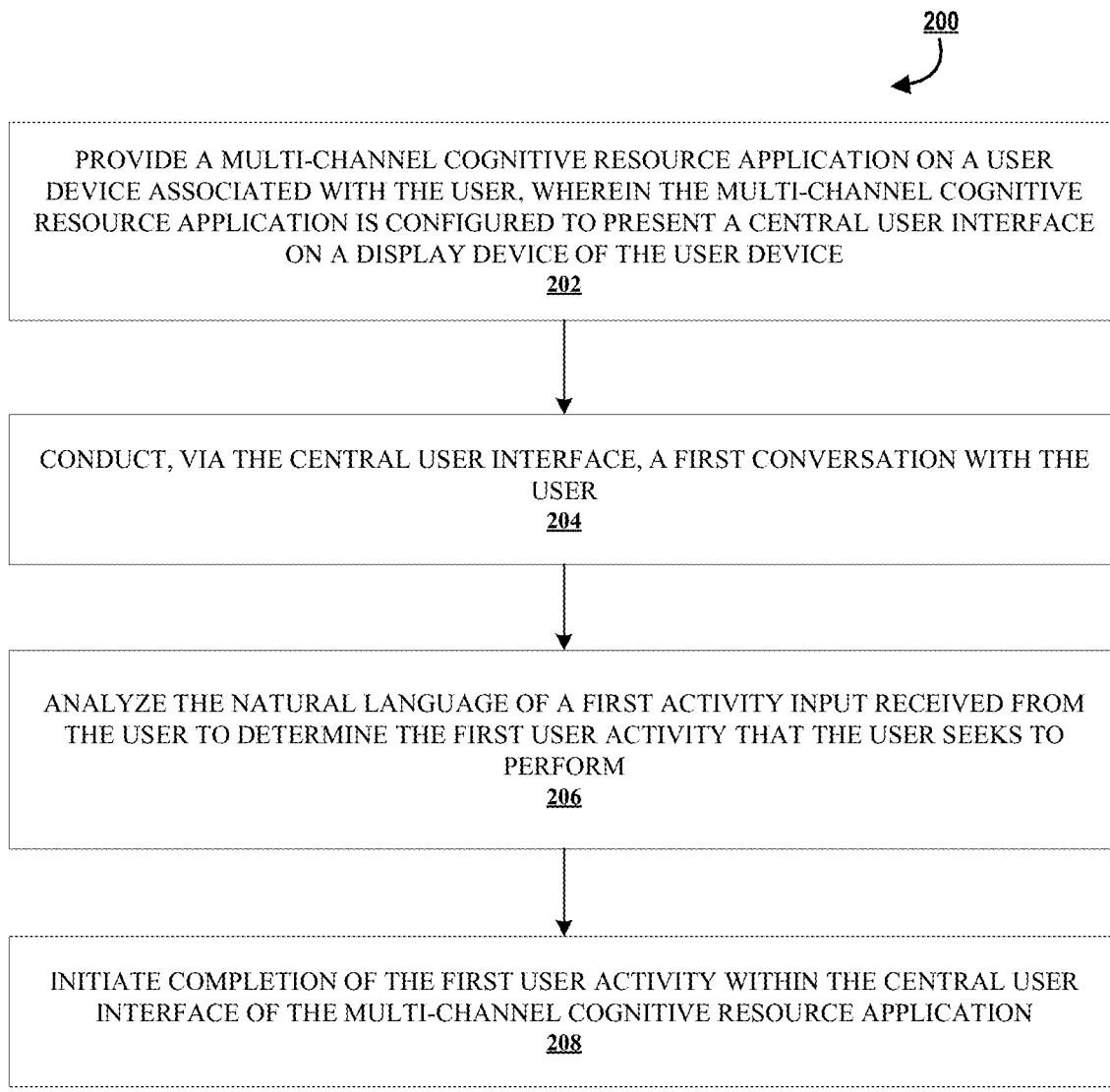
Figure 3:
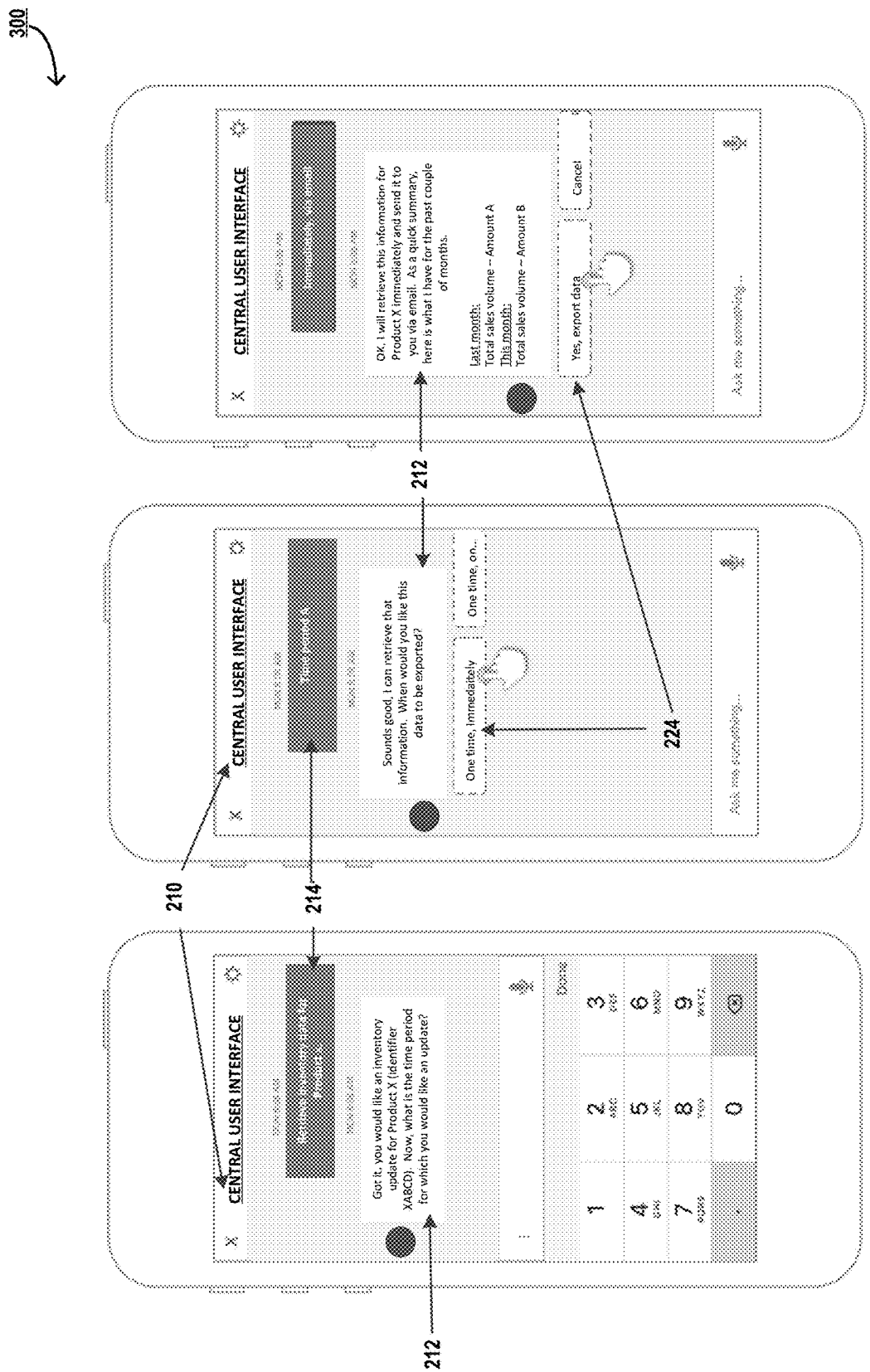
Figure 4:
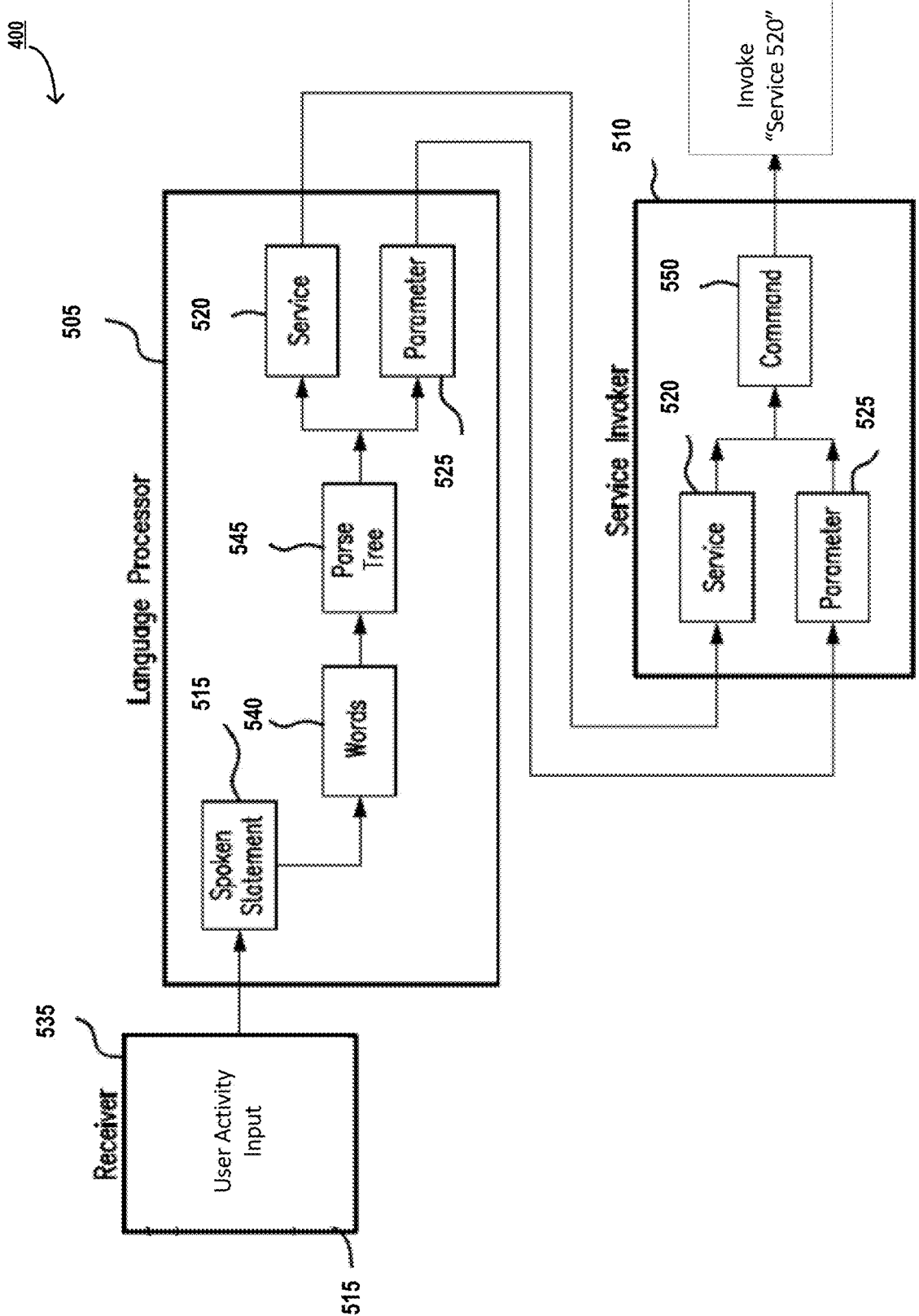

Having thus described embodiments of the invention in general terms, reference will now be made to the accompanying drawings, wherein:

FIG. 1 depicts a platform environment 100 providing a system for adjustment of resource allocation based on multi-channel inputs, in accordance with one embodiment of the present invention;

FIG. 2 depicts a high level process flow 200 for performing electronic activities using the system for adjustment of resource allocation based on multi-channel inputs, in accordance with one embodiment of the present invention;

FIG. 3 depicts instances of a central user interface 300, in accordance with one embodiment of the present invention; and FIG. 4 depicts a high level process flow of a language processing module 400 of a multi-channel cognitive resource platform application, in accordance with one embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In some embodiments, an "entity" or "enterprise" as used herein may be any institution or establishment, associated with a network connected resource transfer platform, and particularly geolocation systems and devices. As such, the entity may be any institution, group, association, financial institution, merchant, establishment, company, union, authority or the like.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein. In some instances, a "user" may refer to a merchant or the like, who utilizes an external apparatus such as a user device, for retrieving information related to the user's business that the entity may maintain or compile. Such information related to the user's business may be related to resource transfers or transactions that other users have completed using the entity systems. The external apparatus may be a user device (computing devices, mobile devices, smartphones, wearable devices, and the like). In some embodiments, the user may seek to perform one or more user activities using a multi-channel cognitive resource application of the invention, which is stored on a user device. In some embodiments, the user may perform a query by initiating a request for information from the entity using the user device to interface with the system for adjustment of resource allocation based on multi-channel inputs in order to obtain information relevant to the user's business.

In the instances where the entity is a resource entity or a merchant, financial institution and the like, a user may be an individual or entity with one or more relationships, affiliations or accounts with the entity (for example, the merchant, the financial institution). In some embodiments, the user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution. For purposes of this invention, the term "user" and "customer" may be used interchangeably. A "technology resource" or "account" may be the relationship that the user has with the entity. Examples of technology resources include a deposit account, such as a transactional account (e.g. a banking account), a savings account, an investment account, a money market account, a time deposit, a demand deposit, a pre-paid account, a credit account, a non-monetary user configuration that includes only personal information associated with the user, or the like. The technology resource or account is typically associated with and/or maintained by an entity, and is typically associated with technology infrastructure such that the resource or account may be accessed, modified or acted upon by the user electronically, for example using or transaction terminals, user devices, merchant systems, and the like. In some embodiments, the entity may provide one or more technology instruments or financial instruments to the user for executing resource transfer activities or financial transactions. In some embodiments, the technology instruments/financial instruments like electronic tokens, credit cards, debit cards, checks, loyalty cards, entity user device applications, account identifiers, routing numbers, passcodes and the like are associated with one or more resources or accounts of the user. In some embodiments, an entity may be any institution, group, association, club, establishment, company, union, authority or the like with which a user may have a relationship. As discussed, in some embodiments, the entity represents a vendor or a merchant with whom the user engages in financial (for example, resource transfers like purchases, payments, returns, enrolling in merchant accounts and the like) or non-financial transactions (for resource transfers associated with loyalty programs and the like), either online or in physical stores.

As used herein, a "user interface" may be a graphical user interface that facilitates communication using one or more communication mediums such as tactile communication (such, as communication via a touch screen, keyboard, and the like), audio communication, textual communication and/or video communication (such as, gestures). Typically, a graphical user interface (GUI) of the present invention is a type of interface that allows users to interact with electronic elements/devices such as graphical icons and visual indicators such as secondary notation, as opposed to using only text via the command line. That said, the graphical user interfaces are typically configured for audio, visual and/or textual communication, and are configured to receive input and/or provide output using one or more user device components and/or external auxiliary/peripheral devices such as a display, a speaker, a microphone, a touch screen, a camera, a GPS device, a keypad, a mouse, and/or the like. In some embodiments, the graphical user interface may include both graphical elements and text elements. The graphical user interface is configured to be presented on one or more display devices associated with user devices, entity systems, auxiliary user devices, processing systems and the like.

An electronic activity, also referred to as a "technology activity" or a "user activity", such as a "resource transfer" or "transaction", may refer to any activities or communication between a user or entity and the financial institution, between the user and the entity, activities or communication between multiple entities, communication between technology applications and the like. A resource transfer may refer to a payment, processing of funds, purchase of goods or services, a return of goods or services, a payment transaction, a credit transaction, or other interactions involving a user's resource or account. In the context of a financial institution or a resource entity such as a merchant, a resource transfer may refer to one or more of: transfer of resources/funds between financial accounts (also referred to as "resources"), deposit of resources/funds into a financial account or resource (for example, depositing a check), withdrawal of resources or finds from a financial account, a sale of goods and/or services, initiating an automated teller machine (ATM) or online banking session, an account balance inquiry, a rewards transfer, opening a bank application on a user's computer or mobile device, a user accessing their e-wallet, applying one or more coupons to purchases, or any other interaction involving the user and/or the user's device that invokes or that is detectable by or associated with the financial institution. A resource transfer may also include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like. Unless specifically limited by the context, a "resource transfer," a "transaction," a "transaction event," or a "point of transaction event," refers to any user activity (financial or non-financial activity) initiated between a user and a resource entity (such as a merchant), between the user and the financial instruction, or any combination thereof.

In some embodiments, a resource transfer or transaction may refer to financial transactions involving direct or indirect movement of funds through traditional paper transaction processing systems (i.e. paper check processing) or through electronic transaction processing systems. In this regard, resource transfers or transactions may refer to the user initiating a funds/resource transfer between account, funds/resource transfer as a payment for the purchase for a product, service, or the like from a merchant, and the like. Typical financial transactions or resource transfers include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures, and the like.

In accordance with embodiments of the invention, the term "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application. In accordance with embodiments of the invention, the term "module" with respect to an apparatus may refer to a hardware component of the apparatus, a software component of the apparatus, or a component of the apparatus that comprises both hardware and software. In accordance with embodiments of the invention, the term "chip" may refer to an integrated circuit, a microprocessor, a system-on-a-chip, a microcontroller, or the like that may either be integrated into the external apparatus or may be inserted and removed from the external apparatus by a user.

FIG. 1 depicts a platform environment 100 providing a system for adjustment of resource allocation based on multi-channel inputs, in accordance with one embodiment of the present invention. As illustrated in FIG. 1, a resource technology system 106, configured for providing an intelligent, proactive and responsive application or system, at a user device 104, which facilitates execution of electronic activities in an integrated manner, and which is capable of adapting to the user's natural communication and its various modes by allowing seamless switching between communication channels/mediums in real time or near real time. The resource technology system is operatively coupled, via a network 101 to one or more user devices 104, auxiliary user devices 170, to entity systems 180, entity databases 190, and other external systems/third-party servers not illustrated herein. In this way, the resource technology system 106 can send information to and receive information from multiple user devices 104 to provide an integrated platform with multi-channel cognitive resource capabilities to a user 102, and particularly to the user device 104. At least a portion of the system for adjustment of resource allocation based on multi-channel inputs is typically configured to reside on the user device 104 (for example, at the multi-channel cognitive resource user application 122), on the resource technology system 106 (for example, at the multi-channel cognitive resource system application 144), and/or on other devices and system and is an intelligent, proactive, responsive system that facilitates execution of electronic activities in an integrated manner. Furthermore, the system for adjustment of resource allocation based on multi-channel inputs is capable of seamlessly adapting to and switch between the user's natural communication and its various modes (such as speech or audio communication, textual communication in the user's preferred natural language, gestures and the like), and is typically infinitely customizable by the system 106 and/or the user 102.

The network 101 may be a global area network (GAN), such as the Internet, a wide area network (WAN), a local area network (LAN), or any other type of network or combination of networks. The network 101 may provide for wireline, wireless, or a combination wireline and wireless communication between devices on the network 101. The network 101 is configured to establish an operative connection between otherwise incompatible devices, for example establishing a communication channel, automatically and in real time, between the one or more user devices 104 and one or more of the auxiliary user devices 170, (for example, based on receiving a user input, or when the user device 104 is within a predetermined proximity or broadcast range of the auxiliary devices 170), as illustrated by communication channel 101a. Therefore, the system, via the network 101 may establish, operative connections between otherwise incompatible devices, for example by establishing a communication channel 101a between the one or more user devices 104 and the auxiliary user devices 170. In this regard, the network 101 (and particularly the communication channels 101a) may take the form of contactless interfaces, short range wireless transmission technology, such near-field communication (NFC) technology, audio frequency (AF) waves, wireless personal area network, radio-frequency (RF) technology, and/or other suitable communication channels. Tapping may include physically tapping the external apparatus, such as the user device 104, against an appropriate portion of the auxiliary user device 170 or it may include only waving or holding the external apparatus near an appropriate portion of the auxiliary user device without making physical contact with the auxiliary user device.

In some embodiments, the user 102 is an individual that wishes to conduct one or more activities with resource technology system 106 using the user device 104. In some embodiments, the user 102 may access the resource technology system 106, and/or the entity system 180 through a user interface comprising a webpage or a user application. Hereinafter, "user application" is used to refer to an application on the user device 104 of the user 102, a widget, a webpage accessed through a browser, and the like. As such, in some instances, the user device may have multiple user applications stored/installed on the user device 104 and the memory device 116 in particular. In some embodiments, the user application is a multi-channel cognitive resource user application 122, also referred to as a "user application" 122 herein, provided by and stored on the user device 104 by the resource technology system 106. In some embodiments the user application 122 may refer to a third party application or a user application stored on a cloud used to access the resource technology system 106 and/or the auxiliary user device 170 through the network 101, communicate with or receive and interpret signals from auxiliary user devices 170, and the like. In some embodiments, the user application is stored on the memory device 140 of the resource technology system 106, and the user interface is presented on a display device of the user device 104, while in other embodiments, the user application is stored on the user device 104.

The user 102 may subsequently navigate through the interface, perform one or more searches or initiate one or more activities or resource transfers using a central user interface provided by the user application 122 of the user device 104. In some embodiments, the user 102 may be routed to a particular destination using the user device 104. In some embodiments the auxiliary user device 170 requests and/or receives additional information from the resource technology system 106/the resource entity system 160 and/or the user device 104 for authenticating the user and/or the user device, determining appropriate queues, executing information queries, and other functions.

FIG. 1 also illustrates the user device 104. The user device 104, herein referring to one or more user devices, wherein each device may generally comprise a communication device 110, a display device 112, a geo-positioning device 113, a processing device 114, and a memory device 116. Typically, the user device 104 is a computing system that allows a user 102 to interact with other systems to initiate or to complete activities, resource transfers, and transactions for products, and the like. The processing device 114 is operatively coupled to the communication device 110 and the memory device 116. The processing device 114 uses the communication device 110 to communicate with the network 101 and other devices on the network 101, such as, but not limited to the resource entity system 160, the auxiliary user device 170 and the resource technology system 106. As such, the communication device 110 generally comprises a modem, server, or other device for communicating with other devices on the network 101. In some embodiments the network 101 comprises a network of distributed servers. In some embodiments, the processing device 114 may be further coupled to a display device 112, a geo-positioning device 113, and/or a transmitter/receiver device, not indicated in FIG. 2. The display device 112 may comprise a screen, a speaker, a vibrating device or other devices configured to provide information to the user. In some embodiments, the display device 112 provides a presentation of the central user interface of the integrated user application 122. The geo-positioning device 113 may comprise global positioning system (GPS) devices, triangulation devices, accelerometers, and other devices configured to determine the current geographic location of the user device 104 with respect to satellites, transmitter/beacon devices, telecommunication towers and the like. In some embodiments the user device 104 may include authentication devices like fingerprint scanners, heart-rate monitors, microphones and the like that are configured to receive bio-metric authentication credentials from the user.

The user device 104 comprises computer-readable instructions 120 stored in the memory device 116, which in one embodiment includes the computer-readable instructions 120 of the user application 122. In this way, users 102 may authenticate themselves, initiate activities, and interact with or receive and decode signals from the auxiliary user devices 170, communicate with the resource technology system 106 to request or transmit information, authorize a transaction, and/or complete a transaction using the central user interface of the user device 104. As discussed previously, the user device 104 may be, for example, a desktop personal computer, a mobile system, such as a cellular phone, smart phone, personal data assistant (PDA), laptop, wearable device, a smart TV, a smart speaker, a home automation hub, augmented/virtual reality devices, or the like. The computer readable instructions 120 such as computer readable/executable code of the user application 122, when executed by the processing device 114 are configured to cause the user device 104 and/or processing device 114 to perform one or more steps described in this disclosure, or to cause other systems/devices to perform one or more steps described herein.

As further illustrated in FIG. 1, the resource technology system 106 generally comprises a communication device 136, at least one processing device 138, and a memory device 140. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 138 is operatively coupled to the communication device 136 and the memory device 140. The processing device 138 uses the communication device 136 to communicate with the network 101 and other devices on the network 101, such as, but not limited to the resource entity systems 160, auxiliary user devices 170 and/or the user device 104. As such, the communication device 136 generally comprises a modem, server, wireless transmitters or other devices for communicating with devices on the network 101. The memory device 140 typically comprises a non-transitory computer readable storage medium, comprising computer readable/executable instructions/code, such as the computer-readable instructions 142, as described below.

As further illustrated in FIG. 1, the resource technology system 106 comprises computer-readable instructions 142 or computer readable program code 142 stored in the memory device 140, which in one embodiment includes the computer-readable instructions 142 of a multi-channel cognitive resource system application 144 (also referred to as a "system application" 144). The computer readable instructions 142, when executed by the processing device 138 are configured to cause the system 106/processing device 138 to perform one or more steps described in this disclosure to cause out systems/devices (such as the user device 104, the user application 122, and the like) to perform one or more steps described herein. In some embodiments, the memory device 140 includes a data storage for storing data related to user transactions and resource entity information, but not limited to data created and/or used by the multi-channel cognitive resource system application 144.

FIG. 1 further illustrates one or more auxiliary user devices, in communication with the network 101. The auxiliary user devices may comprise peripheral devices such as speakers, microphones, smart speakers, and the like, display devices, a desktop personal computer, a mobile system, such as a cellular phone, smart phone, personal data assistant (PDA), laptop, wearable device, a smart TV, a smart speaker, a home automation hub, augmented/virtual reality devices, or the like.

In the embodiment illustrated in FIG. 1, and described throughout much of this specification, a "system" configured for performing one or more steps described herein refers to the user application 122, that may perform one or more user activities either alone or in conjunction with the resource technology system 106, and specifically, the system application 144, one or more auxiliary user device 170, and the like in order to provide a system for adjustment of resource allocation based on multi-channel inputs.

The functions, and features of the system for adjustment of resource allocation based on multi-channel inputs will now be described in detail. As such, the system for adjustment of resource allocation based on multi-channel inputs, and the user application 122 in particular, are configured to function as an intelligent personal assistant and resource navigator and are configured to perform one or more electronic user activities. In particular, the system is configured to present an integrated central user interface for communicating with the user via natural language or conversation channels, for execution of one or more user activities, and for integrating the functionality of multiple applications in a single interface, without requiring the user to access the multiple applications individually and be proficient in their operation.

As such, the user application 122 is configured to perform one or more user activities in a convenient and timely manner, via a central user interface of the application 122. In this regard, in some embodiments, the central user interface is presented on one or more user devices via the user application 122 or another user application 122. The central user interface or multi-channel cognitive resource interface associated with the user application 122 may be presented on the display device 112 of the user device 104 in response to receiving an indication from the user (for example, receiving a voice command from the user with an identifier associated with the multi-channel cognitive resource platform, receiving a tactile indication or a fingerprint authentication from a home button of the device 104, successful authentication of authentication credentials and the like), automatically in response to detecting an action trigger (for example, determining that the user is attempting to perform a user activity by using a particular application, determining that a user resource is associated with a predetermined threshold value, determining that the user is at a predetermined location and the like), and the like. Additionally, the user application 122 is configured to proactively alert the user of information analyzed and compiled by the resource technology system 106 and entity systems 180. This information may include resource transaction information related to other users that interact with the resource technology system 106 if the resource transaction information is identified as being relevant and potentially useful to the user 102. For instance, as stated previously, the user 102 may be a merchant that sells services or goods to other users that maintain accounts with the entity system 180. In these instances, the entity systems 180 may track and record resource transaction information in the entity database 190 and may categorize the data such that certain data relevant to the user 102 can be readily identified and analyzed. In this way, the entity systems 180 may identify patterns indicated in the resource transaction data that are relevant to the user 102, and may further process such data via the resource technology system 106 in order to provide the data to the user 102 in an accessible format, either by request or by alerting the user 102 with a suggestion.

Typically, the central user interface is a computer human interface, and specifically a natural language/conversation user interface for receiving user input (for example, for creating, selecting and modifying data/functionality), presenting information regarding user activities, providing output to the user 102, and otherwise communicating with the user 102 in a natural language of the user 102, via suitable communication mediums such as audio, textual, and the like. The natural language of the user comprises linguistic phenomena such as verbs, phrases and clauses that are associated with the natural language of the user 102. The system is configured to receive, recognize and interpret these linguistic phenomena of the user input and perform user activities accordingly. In this regard, the system is configured for natural language processing and computational linguistics. In many instances, the system is intuitive, and is configured to anticipate user requirements, data required for a particular activity and the like, and request activity data from the user 102 accordingly.

FIG. 2 illustrates a high level process flow for performing electronic activities using the system for adjustment of resource allocation based on multi-channel inputs, in accordance with one embodiment of the present invention. Although, the process flow 200 is described with respect to a user mobile device, it is understood that the process flow is applicable to a variety of other user devices. Furthermore, one or more steps described herein may be performed by the user mobile device 104, user application 122, and/or the system 106. The user application 122 stored on a user mobile device, is typically configured to launch, control, modify and operate applications stored on the mobile device. In this regard, the user application 122 facilitates the user 102 to perform a user activity, such as a request for merchant data, using multiple applications from a centralized user interface, without requiring the user to open and close one application after another. The novel multi-channel functionality for seamless and automatic switching between communication channels will be described herein with respect to FIGS. 2 and 4. Unless specified otherwise, henceforth one or more steps or activities performed by "the system" may refer to activities/steps performed by the resource technology system 106, and/or the user device 104, via, the multi-channel cognitive resource application (user application 122 and/or system application 144).

As indicated by block 202, the system is configured to provide the user application 122 on a user device 104 associated with the user 102. Providing the application may comprise transmitting, installing, storing, initiating and/or opening the user application 122 on the user device 104. The user application 122 is further configured to present a central user interface on a display device 112 of the user device 104. In some instances, the user device 104 is configured to present the user application 122, and the central user interface based on receiving control instructions from the system 106. In some instances, the multi-channel cognitive resource application may be running in the background on the user device, and the control instructions may cause the multi-channel cognitive resource application stored on the user device to present the central user interface or an alert on the display of the user device, automatically. In some embodiments, prior to initiating the presentation of the central user interface or alert, the system may modify an existing display to allow the user to choose to, or prevent the user application from opening. The modification of the existing displays may comprise locking the screen for a predetermined period of time (such as 10 seconds) or until the user acquiesces the opening of the application by user voice, touch, or gesture commands. In addition, the system may also dim the brightness of the existing display for a predetermined period of time (such as 10 seconds) or until the user acquiesces the opening of the application by user voice, touch, or gesture commands, thereby reducing power requirements and drawing the user's attention. In some embodiments, based on determining that the user device 104 does not comprise a user application 122, the system may transmit control instructions that cause the user device and/or facilitate the user to download and install the user application 122. In some embodiments, the central user interface of the user application 122 is similar to the interfaces illustrated and described with respect to FIG. 3 and later on in this disclosure In this regard, in some embodiments, the system may initialize the user application 122 or cause presentation of the central user interface based on determining that the user seeks to initiate a user activity or request. In this regard, the system and/or the user device may identify that the user seeks to initiate a user activity or request based on analyzing a user configuration, based on analyzing data associated with the user's business, based on analyzing user financial information, based on analyzing user social media feeds, and/or based on receiving user input provided using user input devices of the user mobile device or receiving input provided by the entity system. In some instances, the mobile device may determine that the user 102 seeks to initiate a user activity or request based on determining that the user is currently located in a resource entity or merchant facility, and specifically located near a transaction terminal or user activity interface device. In some instances, the mobile device may determine that the user seeks to initiate a user activity based on receiving a wireless signal from a transaction terminal or user activity interface device, via a wireless network. In some instances, the mobile device may determine that the user seeks to initiate a user activity based on receiving a wireless signal from a physical transmitter device associated with a resource entity, via a wireless network. In some instances, the resource technology system may determine that the user may seek to initiate a user activity or request based on a determined pattern in data stored by the entity system.

Next, the system is configured to conduct, via the central user interface, a first conversation with the user, as illustrated by block 204. As discussed previously, the central user interface is a computer human interface, and specifically a natural language/conversation user interface for receiving user input (for example, for creating, selecting and modifying data/functionality), presenting information regarding user activities, providing output to the user, and otherwise communicating with the user in a natural language of the user, via suitable communication mediums such as audio, textual, and the like. A "conversation" as referred to herein may comprise receiving a user input using a suitable communication channel/medium, providing an output to the user using a suitable communication channel/medium, a dialog or interchange comprising receiving one or more user input and providing relevant one or more outputs, and the like. Typically, the conversation components, i.e., the user input received and the output provided by the application are in the natural language of the user, often comprising linguistic phenomena such as verbs, phrases and clauses, as will be described below. As such, the system is configured for natural language communication across multiple communication channels (such as, speech/audio, text, and the like), and is configured to switch between them seamlessly and in real-time, during the conversation.

Conducting the conversation with the user comprises receiving, via the central user interface, a first activity input or user input from the user regarding initiation of a first user activity, wherein the activity input is received through a first communication medium. For example, the system is configured for communication using an audio communication medium, via an audio communication channel. In this regard, the system may receive the user activity input in the form of voice input having natural speech (for example, sentences, phrases, and the like) of the user, captured using a communication device of the user device such as a microphone. Similarly, the system is configured communication using a for textual communication medium, via a textual communication channel. Here, the user may provide user input by entering text in a natural language of the user, using a user input device such as a keypad or the display screen of the device itself. In some instances, in response to receiving the activity input, the system is configured to present the received activity input on the central user interface. For example, the system may transform/convert the received audio input into a textual form and initiate a presentation of the transformed input on the central user interface. Similarly, the system may present the received textual input on the central user interface. In this way, the system may construct a conversation log on the central user interface comprising the received activity input from the user and output provided by the system. In response to receiving the activity input from the user, such as an audio input or textual input from the user, the system may provide output to the user in an audio form, in a visual/textual form, or both. Therefore, the present invention is extremely beneficial for users who are hearing impaired or visually impaired.

As alluded to earlier, the system is configured to receive, recognize and interpret these linguistic phenomena of the user input and perform user activities accordingly. In this regard, the system is configured for natural language processing and computational linguistics. Based on analyzing the received input, the system is configured to determine the user activity or request that the user seeks to perform, as indicated by block 206. Here, in general, the system may parse the activity input from the user to detect one or more words that make up the activity or request input from the user. The system may then analyze words to determine the user activity. For example, the system may receive the following voice activity input from the user: "retrieve sales data for product X." The system may then analyze the one or more words to determine that the user wants to retrieve sales data, for example, based on identifying keywords such as, "sales" and "product X". The system may then proceed to execute the request and retrieve the sales data for product X during a given time period. In some instances, the system may recognize a general category of requests, but may determine that it needs more information in order to successfully retrieve relevant data. For instance using the previous voice activity input example, the system may recognize that the user would like sales data related to a given product from the user's inventory, but may respond to the user requesting a specific time period for which the system should retrieve sales data. In this instance the overall user activity interaction with the system may comprise a more conversational approach versus simply a request and answer, wherein any number of system responses and subsequent user activities or requests are initiated and recognized.

Specifically, based on receiving the activity input from the user, in some instances, the system is configured to generate a parse tree based on detected one or more words and/or the detected keywords. A parse tree is a data structure that allows the system to accurately analyze activity input. For example, the parse tree may indicate the various language structures, such as clauses, phrases, subjects, verbs, and objects in a spoken statement and identify the words in each language structure. The system may analyze the parse tree to determine the user activity to be performed and the intent of the user and also to determine any parameters provided by the user for an invoked service. The system may invoke another application, a service, an activity functionality and the like based on its analysis of parse tree. The system may also initialize the invoked application/service/functionality with any parameters detected in parse tree. Initializing the invokes application/service/functionality comprising extracting pertinent elements from relevant applications on the user device, embedding/inserting the pertinent elements and one or more interactive elements 224, dynamically, into the central user interface in a suitable order, and facilitating completion of the user activity from within the central user interface, without requiring opening and closing of multiple applications or widgets. The dynamic integration of pertinent extracted elements and the central user application will be described below.

Next, the system initiates completion of the first user activity within the central user interface of the multi-channel cognitive resource application, as indicated at block 208. In some embodiments, the system is configured to identify one or more discrete activity events to be carried out for performing the first user activity. For example, for a determined user activity of an inventory update or sales data request, the system may determine user activity events of receiving a product identifier, receiving a time period identifier, authenticating and verifying user credentials, and the like. The system may then present outputs within the central user interface to request information from the user or present requested information, in a suitable order.

In this regard, the integrated user application is configured to dynamically integrate, or embed, data and functionality (action buttons or tools such as, other interface elements), entity identifiers (such as logos, images and the like) of resource entity applications or applications/widgets stored on the user device within the centralized user interface. As such, the application is configured to present the conversation, functionality of the multi-channel cognitive resource application, user activity inputs, outputs, along with functionality/elements extracted from other applications or resource entity applications. Here, the integrated user application is configured to dynamically integrate, or embed, resource entity interfaces, one after another in a sequence, based on a determined progression of the user activity and activity events. In some instances, the integrated user application may load only required portions of the entity applications in a cache memory location, one after another. The user application is further configured to close out or unload each resource entity application from memory after completion of associated activity event. Therefore, because the present invention does not require opening of multiple interfaces, and because the present invention does not require the resource entity applicants to be running in the background throughout the user activity, the present user application provides an improvement to exiting user activity processing, and an increase in processing speeds and a reduction in memory requirements and processing time for the mobile device.

As a non-limiting illustrative example, the system may determine a user activity of requesting sales and inventory data of a first product from a first merchant/resource entity based on a first activity input from the user. In response, the system may determine that the first user activity comprises a first activity event of choosing the first product out of available options or configurations at the first merchant. The system may then access another application of the user device associated with the first merchant, for example, by providing user authentication credentials, and extract application elements (application functionality, media, images, and the like) associated with the first product and available configurations. The system may then embed these extracted elements into the central user interface along with one or more interactive elements 224 to facilitate selection of the products and configurations from the user, as a first output. Based on receiving a suitable selection as a second activity input from the user, the system may then initiate a determined second activity event of requesting projected sales data and embedding elements in the central user interface as a subsequent second output. Furthermore, the system may facilitate receiving user authorization confirmation (i.e., third activity input) by accessing yet another application or security device on the user device in order to authenticate the user and allow access to the requested data.

The system may then commence any number of further event activities of initiating compilation of data, export of data, and the like, via the central user interface. In this regard, the system may request authentication credentials, passcodes, financial instrument information, export format preferences, and the like via an output display 212 within the central user interface. The system may receive corresponding activity input within the central user interface and perform the desired user activity or request, for example using a user email application, and display a confirmation and the like as an output display in the central user interface that the data has been exported or transmitted via a specific channel. Therefore, the user may perform one or more user activities from within the central user interface, via a conversation to achieve a desired result. The activity inputs from the user and the outputs may be displayed in a sequential manner in the central user interface, for example, in a chat display format as a dialog, as illustrated by FIG. 3.

As discussed, the system is further configured to authenticate the user for the user activity, either before or during the activity. In this regard, the user application is configured to provide centralized authentication, without requiring separate credentials for each resource entity application associated with the user activity. In some embodiments, the system is configured to identify the one or more activity events and the one or more external applications or resource entity applications required, for completing the activity events, prior to commencing the activity events. Here, the integrated user application is configured to determine authentication requirements of each of the identified one or more applications associated with completing the user activity. The integrated user application may then identify a highest level of authentication among the applications. Continuing with the previous example, the user application may identify that a mobile wallet application requiring biometric authentication is a higher level of authentication than another application requiring a passcode. In response to determining the highest level of authentication, the user application may request credentials associated with the highest level of authentication from the user. The successful validation of the received credentials associated with the highest level of authentication from the user, by the mobile device, is typically configured to authenticate the user for the other resource entity applications associated with the activity as well, without requiring separate authentication credentials, thereby reducing processing time.

FIG. 3 illustrates the central user interface 300 for multi-channel cognitive resource transfer, in accordance with some embodiments of the invention. As illustrated, the system is configured for initiate presentation of a central user interface 210 of the multi-channel cognitive resource application stored on the user device. As discussed previously, the system may receive user input 214. For example, this input may be received via an audio communication channel and/or a textual communication channel. The system may be configured to interpret and transform, seamlessly and in real-time, one medium to another for presentation on the central user interface 210 (for example, speech to text, text to speech and the like). As illustrated at 214, the system may present the received activity input from the user in a textual format. The system may similarly respond to the user input, as indicated by the output 212, in natural language. In addition, the system may present one or more interactive elements 224 for facilitating the activity, which are embedded, integrated into, or overlaid over the central user interface 210. These interactive elements may be actuated by tactile input (touch commands and other gestures), audio commands or textual input from the user. These interactive elements 224 may be extracted from other pertinent applications, such as resource applications, communication applications, security applications and the like discussed previously.

In addition, the system is intuitive and is configured to hold complex and branched conversations with the user, in the pursuit of completing one or more user activities. In this regard, the system is configured to detect and conduct branched conversations using intelligent complex path looping. In some instances, the system may identify a suitable conversation path for completion of a user initiated activity, and proceed to request information accordingly. For example, for a user activity of ordering more inventory, the system may determine a conversation path comprising requesting the sale price of such inventory, presenting one or more options associated with the inventory located in the user's vicinity, receiving a selection of a particular seller, receiving a time for the sale and the number of items for the order, and the like. Subsequently, the system may automatically make an order for the user at the chosen seller. These conversation paths are typically natural language conversational forms of the user activity events described previously, and may be determined by the system, after or in conjunction with determining the one or more discrete activity events.

In addition, the intelligent complex path looping of the invention enables the system to loop back to the original conversation path for completion of the activity in the instances where the user digresses or the conversation branches out. For the example of the user seeking to conduct a user activity of a resource transfer, for example, the system may receive a user input to perform a bill payment associated with a particular entity. In response, the system may request the resource value or amount to be transferred, as a part of a determined original conversation path. The user may then seek information regarding balances of one or more resources of the user, such as a savings account, a checking account, and the like, branching out from the original conversation path into a first level branch. The system may then provide the real-time balances of the resources. The user may then seek information regarding minimum balances of the resources, expected resource transfers such ad deposits, most recent account activity, and the like, further branching out from the preceding dialogue into second, third and/or fourth level branches. However, the system comprises a content buffer for temporarily storing a predetermined number of dialogues or conversation branches or a particular conversation for conducting a user activity. Based on determining that the predetermined number of dialogues or conversation branches have occurred, the system may loop back, automatically, to the original conversation path and request a transfer amount, a choice of account and the like from the user, and the like for the completion of the resource transfer. Alternatively, the system may receive a user input comprising a transfer amount and a choice of an account from the user, and determine, automatically based on the content buffer, that the user is now referring to the original conversation path, and loop back to the original conversation path accordingly. Continuing with the previous example, the system is further configured for multilevel temporal conversation correlation. Here the system may seek and receive an indication from the user to perform the transfer at a later time. After a certain time, the system may receive an indication from the user to "perform the transfer." Here, the system is configured to correlate the new user input to the historical original conversation part, and subsequently perform the transfer.

As such, the system is configured to employ the foregoing technical features of the multi-channel cognitive resource platform to perform a myriad of user activities. In this regard, the system is configured to harness and present the content and functionality of a plurality of applications, typically associated with execution of a user activity, in the central user interface. The various functions and features of the central user interface/multi-channel cognitive resource interface, will now be described herein. It is understood that these functions and features employ some or all of the aforementioned technical features.

The system is configured to intuitively conduct complex conversations with the user using a suitable communication channel (or a suitable combination of communication channels), at least partially within the central user interface. In this regard, the system is configured to provide information to the user, in response to a trigger, such as a user input or short question, without requiring the user to access and navigate multiple applications and their interfaces. For instance, the system is configured to provide, in real time, relevant and concise information regarding user account balances, user account alerts, merchant inventory data, recent transactions, payment due dates, recurring payments, scheduled deposits/payments, location of nearby entity locations, account detail attributes, personalized offers, and the like (for example, after determining successful validation of user authentication credentials within a predetermined time period). In some instances, the system is configured to answer frequently asked questions in various categories. In some instances, the system is equipped with a search functionality and is configured to retrieve pertinent information, application functionality, help topics and the like.

The system is also configured to execute complex tasks within a single central user interface. For a user activity of checking product inventory, the user may be required to access an authentication application, a merchant application, a database application and the like, separately and in a particular order. Instead, the present invention, provides an improvement over existing technology by performing the user activity within the central user interface, precluding the transfer of the user to multiple interfaces. The system automatically determines a conversation path for seeking and receiving user authentication credentials, product information (by retrieving a displaying content and audio visual elements of a merchant interface or a shopping list interface, within the central user interface), and the like, in a suitable order, within the central user interface. Accordingly, the system may then, automatically, initiate the user action based on communication with various systems and then present the desired information. For instance, the system is also configured to perform the following user activities within the user interface: payment transfers, transfer of funds between user accounts, bill payments, creating/modifying spend levels by product categories or by merchants, and enrolling in alerts related to inventory levels and historical volumes.

In some embodiments, the system is further configured to transfer the user to another suitable interface for at least partially completing a user activity. For example, the user may invoke the multi-channel cognitive resource user application using an audio input regarding depositing a check. The multi-channel cognitive resource user application may then, automatically, initiate a visual capture device of the user device, and invoke the associated application interface for the user to capture an image of the check. Here, although the visual capture interface is presented, the multi-channel cognitive resource user application associated with the central user interface is typically configured to run in the background, and receive and respond to communication from the user. In response to determining that the image of the check has been captured, the system may initiate a presentation of the captured image within the central user interface, and proceed with the check deposit. Furthermore, the system may invoke one or more optical character recognition (OCR) applications to determine textual information associated with the check. The system may populate the determined text in the central user interface and enable the user to make any changes if necessary, before proceeding with the deposit. In a similar manner, the system may enable the user to activate a new debit or credit card by capturing an image of the card, in real time. As another example, the system is configured to scan one or more QR codes while the user is visiting a location, such as a financial institution or a merchant location. The system may populate information or personalized motivations associated with the scanned codes in the central user interface, at a later time for the user's review.

That said, the system is also configured to transfer control to another application entirely. For example, during a conversation with the user, the system may anticipate that resolution of the user activity may require assistance of an associate. The system may then initiate a call or a chat with an available associate, while continuing the conversation with the user, thereby saving time. Next, the system may present an entity interface for initiation of the conversation with the associate, thereby transferring control to the entity interface.

In addition to the responsive functions described above, the system is also configured for proactive and predictive functions. In this regard, the system is configured to anticipate user requirements and assist user in completion of one or more user activities. In this regard, the system is configured for tactical resource management. Here the system is configured to alert the user, for example via the central user interface, regarding seasonal sales patterns, identified popular products among a certain customer base or location, low inventory of certain products in certain areas, competitive pricing of certain products by other merchants, and the like. In addition, the system is configured to provide forecast of account balances, help the user prevent the account balance from falling below a predetermined limit, remind the user to initiate bill payments in a timely manner, and the like.

In this regard, the aforementioned factors may be passive triggers that are either information or do not require immediate action, and active triggers that require action from the user within a predetermined amount of time. In some instances, the system may present active and/or passive triggers in response to determining that the user has accessed the multi-channel cognitive resource user application and/or another predetermined application. In some instances the system may present the active triggers, such as account balance thresholds, unusual activity alerts, and the like, by transmitting auditory or vibratory alerts that cause the user device to present the central user application, automatically, and in real-time. In some instances, with respect to the passive triggers, such as account recommendations, personalized offers and the like, the system may initiate presentation of the associated information after performing sentiment and tonal analysis.

In some embodiments, the system may analyze data received from outside the entity system(s) 180, such as data received from one or more third party systems, and analyze such data in order to make a determination or recommendation that may be forwarded to the user via the user device. For instance, in embodiments where the user is a merchant, the system may receive data indicating that a third party is selling or marketing inventory similar or identical to inventory of the user at a lower price than the user is currently advertising, and may push an alert to the user indicating this information or indicating one or more recommendations for resource adjustment that the user can make.

In other embodiments, the system may receive data and analyze the data to determine that certain products offered by the entity itself are being utilized by one or more users, and may push an alert or recommendation to users that are not using the products. For instance, the system may determine a correlation in resource transactions for a group of users based on their enrollment in a price program that the entity sponsors or manages. Increased customer activity associated with enrollment in the program or product offered by the entity may be indicated to the user via the user device on the multi-channel cognitive resource platform.

In still other embodiments, the system may use data collected about the user and the user's business in order to preemptively determine or predict useful or helpful products or services that the user may need. For instance, the system may receive data on the entity system indicating that the user has hired new employees, stocked a large amount of a particular good or inventory, installed new point-of-sale systems, or may be using outdated technology systems. In these instances, the system may analyze such data and make determinations regarding certain products offered by the entity or sponsored by the entity that the user may need. For instance, the entity may offer certain bundles of services and products for managing point-of-sale devices, resource transfers, and the like, and may determine that the user may need to contact on-boarding support in order to get new or additional systems up and running. The system may push an alert to the user via the multi-channel cognitive resource management platform and may provide additional information, such as a direct link to contact support or an opportunity for the user to interact with the system, either via textual, audio, voice, biometric, and other communication channels in order to further determine the user's needs or desire to pursue recommendations provided by the system.

In this regard, the system may analyze user and device characteristics for a predetermined period of time, such as analyze current device usage patterns (for example, determining whether the user is currently involved in completing a user activity, determining whether the user is merely browsing a social media account, determining that the user is currently travelling and being routed to a particular location, and the like), perform tonal analysis (for example, determine that the user is in a hurry based on detecting predetermined vocal parameters in the user's voice), perform sentiment analysis (for example, analyze the user's facial expressions when the user is utilizing an image capture device), user device location, and the like. The system may then initiate presentation of information associated with passive triggers based on determining predetermined characteristics (for example, determining that the user is at the user residence, and/or determining that the user is not associated with a user activity, either currently or in the near future).

In addition, the system is typically configured for strategic management of the user's resources. In this regard, the system may be equipped with a detection feature for determining idle resources, unspent resources for each month, windfall deposits, changes in resource amounts, completion of goals, ceasing/completion of recurring transfers/expenses, and the like. In response, the system may suggest user management actions to mitigate potential problems and/or better manage and grow resources, to save and invest. The system may further educate the user in one or more financial topics for strategic management of the user's resources or management of product marketing. In some instances, the system is configured to provide personalized decision support/guidance, for example, to help the user decide between multiple user management actions, by providing user specific information to enable the user to make an informed choice. Here, the system is configured to guide the user through complex, multi-line management decisions. As another example, the system may suggest that the user stock a particular product during a certain time period based on historical seasonal changes in product demand. The strategic management information are presented, in some embodiments, in a similar manner described with respect to passive triggers.

Furthermore, in response to the tactical resource management and strategic resource management described above, the system is configured to implement and complete one or more user resource management actions/activities. For example, the system may help the user perform one-time resource transfers, setup recurring transfers, create goals, open new accounts, provide information about saving and investing, and the like.

In some embodiments, the system, and specifically the user application 122 of the user device 104 is configured to establish operative communication channels with auxiliary user devices 170, operating systems/personal assistants associated with the auxiliary user devices 170, and/or other personal assistants associated with the user device 104 itself. For example, the user application and hence the central user interface, is configured to communicate with other auxiliary devices such as smart appliances, device automation hubs, thermostats, safety and security sensors and other Wi-Fi or near-field or audio wave communication enabled devices, to determine usage patterns, to automatically turn the devices on and off based on usage requirements to produce energy and financial savings, and the like, for example after requisite authentication verification. As another example, the system is configured for seamless integration with existing personal digital assistants of the user device, and transfer control to and from the assistants, in real time, for execution of user activities. In some embodiments, the system is configured to communicate with auxiliary devices such as virtual reality (VR) headsets, augmented reality (AR) devices and the like. In this regard, the system may initiate presentation of the central user interface, seamlessly, on displays associated with the axially VR and AR devices. In some instances, the system is configured to transfer an existing conversation of the multi-channel cognitive resource user application to other personal digital assistant interfaces or other auxiliary device, for performance of further steps. In this regard, the system is configured to update the personal digital assistant or the auxiliary device regarding the most recent dialogue, future activities/steps to be performed, status of the current conversation, and the like.

As another example, the system is configured for voice biometrics, and is configured to authenticate the user based on the user's audio credentials, both for the multi-channel cognitive resource user application and other applications of the user device, and also as a centralized authentication means for the one or more auxiliary devices. In this regard, the system may convey indications of successful authentication of the user to one or more auxiliary devices.

FIG. 4 depicts a high level process flow of a language processing module 400 of a multi-channel cognitive resource platform application, in accordance with one embodiment of the invention. The language processing module 400 is typically a part of the multi-channel cognitive resource application of the user device, although in some instances the language processing module resides on the system 106. As discussed earlier, the natural language of the user comprises linguistic phenomena such as verbs, phrases and clauses that are associated with the natural language of the user. The system, and the language processing module 400 in particular, is configured to receive, recognize and interpret these linguistic phenomena of the user input and perform user activities accordingly. In this regard, the language processing module 400 is configured for natural language processing and computational linguistics. As illustrated in FIG. 4, the language processing module 400 includes a receiver 535 (such as a microphone, a touch screen or another user input or output device), a language processor 505 and a service invoker 510.

Receiver 535 receives an activity input 515 from the user, such as a user activity input 515 provided using an audio communication medium. Although described with respect to an audio communication medium, the language processing module 400 is not limited to this medium and is configured to operate on input received through other mediums such as textual input, graphical input (such as sentences/phrases in images or videos), and the like. As an example, the user may provide an activity input comprising the sentence "I want to check inventory volume for product x from last Fall." The receiver 535 may receive the user activity input 515 and forward the user activity input 515 to the language processor 505. An example algorithm for the receiver 535 is as follows: wait for activity input; receive activity input; pick up activity input; receive user activity input 515; and forward user activity input 515 to language processor 505.

The language processor 505 receives user activity input 515 and processes user activity input 515 to determine an service 520 or service 520 to invoke to respond to activity input and any parameters 525 needed to invoke service 520. The language processor 505 may detect a plurality of words 540 in user activity input 515. Using the previous example, words 540 may include: inventory, volume, and product x. The language processor 505 may process the detected words 540 to determine the service 520 to invoke to respond to activity input.

The language processor 505 may generate a parse tree based on the detected words 540. Parse tree may indicate the language structure of user activity input 515. Using the previous example, parse tree may indicate a verb and infinitive combination of "want" and "to check" and an object of "inventory" with the modifier of "product x." The language processor 505 may then analyze the parse tree to determine the intent of the user and the activity associated with the conversation to be performed. For example, based on the example parse tree, the language processor 505 may determine that the user wants to check inventory of a specific product.

The language processor 505 may also determine from the parse tree that "inventory" is modified by "product x" and "last Fall." The language processor 505 may extract "product x" and "last Fall" as values for parameters 525 (e.g. date and type parameters) to the check inventory service 520. The values of the parameters 525 may be "product x" and "last Fall." The language processor 505 may then forward the determined service 520 and the values of the parameters 525 to service invoker 510.

An example algorithm for the language processor 505 is as follows: wait for user activity input 515; receive user activity input 515 from receiver 535; parse user activity input 515 to detect one or more words 540; generate parse tree using the words 540; detect an intent of the user by analyzing parse tree; use the detected intent to determine a service to invoke; extract values for parameters from parse tree; and forward service 520 and the values of parameters 525 to service invoker 510.

Next, the service invoker 510 receives determined service 520 comprising required functionality and the parameters 525 from the language processor 505. The service invoker 510 may analyze service 520 and the values of parameters 525 to generate a command 550. Command 550 may then be sent to instruct that service 520 be invoked using the values of parameters 525. In response, the language processor 505 may invoke a bill pay functionality of an internet provider resource application of the user device, for example, by extracting pertinent elements and embedding them within the central user interface as discussed previously. An example algorithm for service invoker 510 is as follows: wait for service 520; receive service 520 from the language processor 505; receive the values of parameters 525 from the language processor 505; generate a command 550 to invoke the received service 520 using the values of parameters 525; and communicate command 550 to invoke service 520.

In some embodiments, the system also includes a transmitter that transmits audible signals, such as questions, requests and confirmations, back to the user. For example, if the language processor 505 determines that there is not enough information in user activity input 515 to determine which service 520 should be invoked, then the transmitter may communicate an audible question back to the user for the user to answer. The answer may be communicated as another user activity input 515 that the language processor 505 can process to determine which service 520 should be invoked. As another example, the transmitter may communicate a textual request back to the user. If the language processor 505 determines that certain parameters 525 are needed to invoke a determined service 520 but that the user has not provided the values of these parameters 525. For example, if the user had initially stated "I want to check inventory," the language processor 505 may determine that certain values for parameter 525 are missing. In response, the transmitter may communicate the audible request "what product would you like to check inventory for?" As yet another example, the transmitter may communicate an audible confirmation that the determined service 520 has been invoked. Using the previous example, the transmitter may communicate an audible confirmation stating "Great, let me forward you our data on that product." In this manner, the system may dynamically interact with the user to determine the service 520 to invoke to respond to the user.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for establishing intelligent, proactive and responsive communication with a user, comprising a multi-channel cognitive resource platform for performing electronic activities in an integrated manner from a single interface, the system comprising:

at least one memory device with computer-readable program code stored thereon;

at least one communication device;

at least one processing device operatively coupled to the at least one memory device and the at least one communication device, wherein executing the computer-readable program code is configured to cause the at least one processing device to:

provide a multi-channel cognitive resource application on a user device associated with the user, wherein the multi-channel cognitive resource application is configured to assist with movement and management of resources and present a central user interface on a display device of the user device;

display, via the central user interface, a first user activity request option;

conduct, via the central user interface, a first conversation with the user, wherein conducting the first conversation comprises:

receiving, via the central user interface, a user activity input from the user regarding initiation of a user activity request, wherein the user activity input is received through a first communication medium; and presenting, via the central user interface, the received user activity input from the user;

analyze content of the user activity request received from the user to determine a set of response options;

receive inventory data for one or more inventory items of the user's business, wherein the inventory data comprises current and past inventory levels and price of the one or more inventory items of the user's business;

receive third party inventory data from one or more third party systems, wherein the third party inventory data comprises current and past inventory levels and a third party price of the inventory items;

identify a discrepancy in price between the price of the inventory items of the user's business and the third party price;

display, via the central user interface, the set of selectable response options, wherein the set of selectable response options include retrieval of information related to movement and management of resources between resource accounts and a recommendation to set a lower price of the inventory items or order more of the inventory items;

receive, via the central user interface, an indication that the user has selected a specific response option from the set of selectable response options;

in response to receiving the indication that the user has selected a specific response option, retrieve and compile the information related to the movement or management of resources between the resource accounts; and initiate completion of the specific response option within the central user interface of the multi-channel cognitive resource application via a display of compiled information.

2. The system of claim 1, wherein the receiving an indication that the user has selected a specific response option further comprises using a second communication medium to communicate with the user that is different from the first communication medium.

3. The system of claim 2, wherein the first communication medium comprises an audio channel and the second communication medium comprises a textual communication channel, wherein switching the communication channel of the first conversation comprises switching, automatically, from the audio channel to the textual communication channel.

4. The system of claim 1, wherein the first communication medium comprises recorded audio of the user's voice received via the central user interface on the user device.

5. The system of claim 1, wherein analyzing the content of the user activity request received from the user further comprises:
parsing the first user activity input to determine one or more activity keywords associated with the user activity request; and
generating a tree of response options related to the activity keywords associated with the user activity request.

6. The system of claim 1, further comprising authenticating the user prior to initiating completion of the specific response option, wherein authenticating the user includes accessing a security parameter of another application on the user device.

7. The system of claim 1, wherein presenting the received user activity input comprises transforming, in real-time, user activity input received through an audio communication channel to a textual input.

8. A computer program product for establishing intelligent, proactive and responsive communication with a user, wherein the computer program product is configured to provide a multi-channel cognitive resource platform for performing electronic activities in an integrated manner from a single interface, the computer program product comprising a non-transitory computer-readable storage medium having computer-executable instructions to:
provide a multi-channel cognitive resource application on a user device associated with the user, wherein the multi-channel cognitive resource application is configured to assist with movement and management of resources and present a central user interface on a display device of the user device;
display, via the central user interface, a first user activity request option;
conduct, via the central user interface, a first conversation with the user, wherein conducting the first conversation comprises:
receiving, via the central user interface, a user activity input from the user regarding initiation of a user activity request, wherein the user activity input is received through a first communication medium; and
presenting, via the central user interface, the received user activity input from the user;
analyze content of the user activity request received from the user to determine a set of response options;
receive inventory data for one or more inventory items of the user's business, wherein the inventory data comprises current and past inventory levels and price of the one or more inventory items of the user's business;
receive third party inventory data from one or more third party systems, wherein the third party inventory data comprises current and past inventory levels and a third party price of the inventory items;
identify a discrepancy in price between the price of the inventory items of the user's business and the third party price;
display, via the central user interface, the set of selectable response options, wherein the set of selectable response options include retrieval of information related to movement and management of resources between resource accounts and a recommendation to set a lower price of the inventory items or order more of the inventory items;
receive, via the central user interface, an indication that the user has selected a specific response option from the set of selectable response options;
in response to receiving the indication that the user has selected a specific response option, retrieve and compile the information related to the movement and management of resources between the resource accounts; and
initiate completion of the specific response option within the central user interface of the multi-channel cognitive resource application via a display of compiled information.

9. The computer program product of claim 8, wherein the receiving an indication that the user has selected a specific response option further comprises using a second communication medium to communicate with the user that is different from the first communication medium.

10. The computer program product of claim 9, wherein the first communication medium comprises an audio channel and the second communication medium comprises a textual communication channel, wherein switching the communication channel of the first conversation comprises switching, automatically, from the audio channel to the textual communication channel.

11. The computer program product of claim 8, wherein the first communication medium comprises recorded audio of the user's voice received via the central user interface on the user device.

12. The computer program product of claim 8, wherein analyzing the content of the user activity request received from the user further comprises:
parsing the first user activity input to determine one or more activity keywords associated with the user activity request; and
generating a tree of response options related to the activity keywords associated with the user activity request.

13. The computer program product of claim 8, further comprising authenticating the user prior to initiating completion of the specific response option, wherein authenticating the user includes accessing a security parameter of another application on the user device.

14. The computer program product of claim 8, wherein presenting the received user activity input comprises transforming, in real-time, user activity input received through an audio communication channel to a textual input.

15. A computer implemented method for establishing intelligent, proactive and responsive communication with a user, wherein the computer implemented method is configured to provide a multi-channel cognitive resource platform for performing electronic activities in an integrated manner from a single interface, the computer implemented method comprising:
- providing a multi-channel cognitive resource application on a user device associated with the user, wherein the multi-channel cognitive resource application is configured to assist with movement and management of resources and present a central user interface on a display device of the user device;
- displaying, via the central user interface, a first user activity request option;
- conducting, via the central user interface, a first conversation with the user, wherein conducting the first conversation comprises:
  - receiving, via the central user interface, a user activity input from the user regarding initiation of a user activity request, wherein the user activity input is received through a first communication medium; and
  - presenting, via the central user interface, the received user activity input from the user;
- analyzing content of the user activity request received from the user to determine a set of response options;
- receiving inventory data for one or more inventory items of the user's business, wherein the inventory data comprises current and past inventory levels and price of the one or more inventory items of the user's business;
- receiving third party inventory data from one or more third party systems, wherein the third party inventory data comprises current and past inventory levels and a third party price of the inventory items;
- identifying a discrepancy in price between the price of the inventory items of the user's business and the third party price;
- displaying, via the central user interface, the set of selectable response options wherein the set of selectable response options include retrieval of information related to movement and management of resources between resource accounts and a recommendation to set a lower price of the inventory items or order more of the inventory items;
- receiving, via the central user interface, an indication that the user has selected a specific response option from the set of selectable response options;
- in response to receiving the indication that the user has selected a specific response option, retrieving and compiling the information related to the movement and management of resources between the resource accounts; and
- initiating completion of the specific response option within the central user interface of the multi-channel cognitive resource application via a display of compiled information.

16. The computer implemented method of claim 15, wherein the receiving an indication that the user has selected a specific response option further comprises using a second communication medium to communicate with the user that is different from the first communication medium.

17. The computer implemented method of claim 16, wherein the first communication medium comprises an audio channel and the second communication medium comprises a textual communication channel, wherein switching the communication channel of the first conversation comprises switching, automatically, from the audio channel to the textual communication channel.

18. The computer implemented method of claim 15, wherein the first communication medium comprises recorded audio of the user's voice received via the central user interface on the user device.

19. The computer implemented method of claim 15, wherein analyzing the content of the user activity request received from the user further comprises:
- parsing the first user activity input to determine one or more activity keywords associated with the user activity request; and
- generating a tree of response options related to the activity keywords associated with the user activity request.

20. The computer implemented method of claim 15, further comprising authenticating the user prior to initiating completion of the specific response option, wherein authenticating the user includes accessing a security parameter of another application on the user device.

* * * * *